Patented Oct. 7, 1952

2,613,203

UNITED STATES PATENT OFFICE 2,613,203

METHOD FOR POLYMERIZING TETRA-FLUOROETHYLENE

Robert L. Myers, Burnt Hills, N. Y., assignor to General Electric Company, a corporation of New York No Drawing. Application June 28, 1950, Serial No. 170,947

10 Claims. (Cl. 260—92.1)

This invention is concerned with a method for making polymeric tetrafluoroethylene. More particularly, the invention is concerned with a process for making high molecular weight, substantially heat-stable polymeric tetrafluoroethylene which comprises (1) forming an aqueous suspension of a mixture of ingredients having a pH below 4.0 and comprising (a) tetrafluoroethylene, (b) water, (c) an organic peroxide polymerization catalyst, (d) a heavy metal compound whose metal ion is capable of existing in at least two valence states, which compound is soluble in the tetrafluoroethylene, for example, a monomer-soluble iron salt, (e) a water-soluble reducing agent readily oxidized in the presence of the polymerization catalyst and the aforesaid heavy metal compound and (2) effecting reaction between the ingredients at a temperature below 35° C. while agitating the mixture of ingredients.

One of the objects of this invention is to prepare polymeric tetrafluoroethylene.

A further object of this invention is to obtain polymeric tetrafluoroethylene in good yield.

Another object of the invention is to obtain polymeric tetrafluoroethylene having a high softening point of at least above 350° C.

It has been known heretofore that polymeric tetrafluoroethylene can be prepared by polymerizing the monomer in bulk using various polymerization catalysts. However, such methods have not been satisfactory since it has been found that bulk polymerization of tetrafluoroethylene for substantially long period of time under autogenous pressure gives relatively low yields or conversion of the initial monomer. Such yields can be increased by using high pressure of the order of about 1000 p. s. i. or higher. The polymerization of tetrafluoroethylene has also been described by means of emulsion or suspension polymerization, but such type of polymerization requires relatively high pressures and temperatures.

I have now discovered unexpectedly that by employing a particular combination of conditions of reaction I am able to obtain from the monomeric tetrafluoroethylene good yields of the polymer whose properties are more than satisfactory, especially polymers whose softening points are above 350° C., and which under pressure sinter to clear specimens at 425° C. to 450° C. These results are obtained by conducting the polymerization of tetrafluoroethylene in the form of an aqueous suspension using a particular combination of ingredients and a particular ratio of such ingredients while maintaining the pH of the system within a fairly narrow range.

The first condition which is necessary for the practice of my invention is that the reaction be conducted in the form of an aqueous suspension. In preparing the suspension of the tetrafluoroethylene, the ratio of water to monomer is preferably varied within certain limits. Thus, on a weight basis I may use a ratio greater than 1 and up to 8 or more parts water per part of monomeric tetrafluoroethylene. The ratio of water is critical, and I have found that the water should be present in a ratio greater than 1 to 1, for example, from about 2 to 6 parts of water per part of the monomer. Below a ratio of two parts water per part monomer, the rate of conversion of the monomer to the polymer may decrease rapidly. It will, of course, be apparent that although larger amounts of water may be used, excess amounts thereof may not be advantageous under some circumstances since it will require larger reaction vessels and greater handling than where the water-to-monomer ratio is within the range described above. This, however, does not mean that ratios of water-to-monomer in excess of, for example, 2 to 1, for instance, 6 to 1 or more may not be used, and I do not intend to be limited in this respect to upper ranges of water-to-monomer ratios.

As another condition for effecting optimum polymerization of the tetrafluoroethylene, it has been found essential that the pH of the system be maintained within fairly narrow limits. I have found that a pH of from about 2.3 to 4.0 preferably from about 2.5 to 3.5 is eminently suitable. Within the above described pH ranges, conversions ranging from about 75% to 95% of the monomer to polymer are feasible. When a pH below or above this range is employed under equivalent conditions, the tendency is toward lower conversion rates.

It is known (U. S. Patent 2,394,243) that tetrafluoroethylene reacts rapidly with oxygen in the presence of water to produce quantities of hydrogen ion. Presumably it is, therefore, obvious that in order to maintain the pH range described above, oxygen should be excluded almost completely from the reaction during the course of the polymerization. This can be accomplished by degassing both the water and monomer by conventional means and charging them to an evacuated reaction vessel while excluding air during the transfer. For example, the inclusion of only a few mm. of air pressure or oxygen is sufficient to change the effective pH range for the reaction.

I prefer to use organic catalysts, especially organic catalysts of the peroxide type, capable of acting as a source of free radicals. Among such catalysts may be mentioned, for example, the various diacyl, acyl, alkyl, etc., peroxides, specific examples which are, for instance, benzoyl peroxide, tertiary butyl perbenzoate, lauroyl peroxide, di-(t-butyl) dipersuccinate, dichlorobenzoyl peroxide, di-(t-butyl) diperphthalate, etc. The amount of catalyst employed is preferably varied within certain ranges in order to obtain optimum conversion of the monomer to polymer and influence molecular weight. This is advantageously within the range of from about 0.005% to 2%, by weight, more particularly from about 0.01% to 0.5%, by weight, based on the weight of the monomer.

In conducting the reaction, it has been found essential to employ what is known as a "redox system" comprising (a) a heavy metal compound which has solubility in the tetrafluoroethylene, the heavy metal ion of which is capable of existing in two valence states, e. g., salts of iron, cobalt, nickel, manganese, copper, zinc, silver, etc., and (b) a compound capable of converting the heavy metal ion to a lower valence state. I prefer to use heavy metal compounds in which the heavy metal is in group VIII, namely, cobalt, iron and nickel, particularly iron compounds. The omission of either or both members of this redox system in my invention unexpectedly markedly reduces the yield of the polymer.

The heavy metal compounds can be employed either in the higher or lower valence state. Thus, referring specifically to iron salts, the compound of iron may have the iron either in the ferrous or ferric oxidation state. By means of the reducing agent, a dynamic equilibrium is set up whereby the ferric ion is reduced to the ferrous state. The ferrous ion then reacts with the polymerization initiator to liberate free radicals from the initiator at lower temperatures than would ordinarily be possible.

In this process of reaction, the ferrous ion in turn is oxidized to the ferric state by its reaction with the polymerization initiator. It is able to react with the reducing agent again to convert it to the ferrous state where it is once more available for reaction with the polymerization initiator. In order to effect the reaction of the ferrous ion with the polymerization initiator while it is in the oil or monomer phase, it is necessary to use a compound which can combine with the heavy metal ion to effect solubilization of the heavy metal ion in the monomer.

Such monomer-soluble heavy metal compounds may be introduced in the preformed state or may be formed in situ in the reaction mass. Among the preformed monomer-soluble heavy metal compounds which I may use are, for instance, iron benzoate, iron citrate, iron stearate, cobalt citrate, nickel citrate, nickel benzoate, copper citrate, chelates of heavy metal ions, etc. It will, of course, be apparent to those skilled in the art that salts of other of the heavy metal compounds mentioned above in conjunction with other monomer solubilizing agents, for instance, citric acid, fatty acids, 1,3-diketo compounds, etc., may also be employed without departing from the scope of the invention.

Instead of using a preformed monomer-soluble heavy metal compound, one may employ an originally monomer-insoluble heavy metal compound or salt and effect solubilization by the addition of a suitable agent or solubilizing compound capable of combining with the heavy metal ion to form a monomer-soluble complex or monomer-soluble salt. Among such solubilizing agents may be mentioned, for example, benzoic acid, sodium benzoate, citric acid, various chelates, e. g., acetyl acetone, etc.; salicylaldehyde, stearic acid, etc. The amount of solubilizing agent may be varied within fairly wide limits, for instance, from about 10% to 100%, by weight, based on the weight of the heavy metal compound, and is preferably present in a molecular equivalent with the heavy metal compound.

The heavy metal compounds originally insoluble in the monomer may comprise any one of many used in well-known redox systems for the stipulated purpose. Among these may be mentioned, for example, iron phosphates, including ferric and ferrous phosphates; ferrous ammonium sulphate, ferrous sulphate, ferric chloride, ferric citrate, ferric tartrate, ferric laurate, ferric pyrophosphate, ferrous thiosulfate, ferrous thiocyanate, cobaltic chloride, cobaltic sulfate, colbaltous ammonium sulphate, cobaltous sulphate, nickel chloride, nickel phosphate, nickel sulphate, etc. These heavy metal compounds or salts are preferably present in small amounts of the order of from about 0.01% to 0.50%, by weight, based on the weight of the monomeric tetrafluoroethylene. An optimum range for best yield of the polymer lies between about 0.04% to 0.2% of the iron salt based on the weight of the monomer.

As a second of the components of the "redox system," there is employed a reducing agent which is readily oxidized in the presence of the polymerization catalyst and heavy metal compound, e. g., the iron salt or iron promoter. Various reducing agents may be employed as, for example, sodium bisulfite, potassium bisulfite, sodium hydrosulfite; other oxidizable sulfoxy and sulphur containing compounds, for instance, sulfurous acid, sulphites, hydrosulphites, thiosulphates, sulfides, sulfoxalates, etc. The amount of the reducing agent may be varied, for instance, from about 0.005% to 1%, by weight, or more based on the weight of water, and is not critical, though it is preferably present in an amount ranging from about 0.01% to 0.5%, by weight. Further examples of heavy metal compounds and reducing agents which may be employed in the redox system may be found, for instance, in U. S. Patents 2,380,473-477.

Throughout the reaction, agitation is preferably employed. It has been found that if agitation of the reaction mixture is omitted during the course of polymerization, there is a considerable slow-down in the rate of reaction.

Since the monomeric tetrafluoroethylene is a gas at normal temperatures and pressures, it is advantageous to conduct the reaction in a closed vessel under superatmospheric pressure. I have found it satisfactory to operate the reaction under the autogenous pressure of the reactants in a closed vessel. As will be apparent to those skilled in the art, the temperature of polymerization will determine the pressure of the system. Using the preferred temperature ranges, it will be found that the pressures employed will range from about 20 to 400 p s i., preferably from 100 to 300 p s i., which is much lower than has heretofore been employed in the polymerization of the same monomer. However, I do not intend to be limited to these particular pressures since, as far as can be determined, they are not particularly critical and, under many conditions of reaction, higher or lower pressures may be employed without departing from the scope of the invention.

One of the most important advantages of my process for preparing polymeric tetrafluoroethylene resides in the fact that relatively low temperatures can be employed compared to other processes involved in the polymerization of the same or similar monomers which may require relatively higher temperatures. Thus, I may use temperatures ranging from about 0° C. to 35° C., preferably from about 0° C. to 25° C., in which range the most advantageous utilization of the combination of the ingredients and conditions is realized. At temperatures above 35° C. or 45° C., the catalyst decomposes too rapidly and tends to give low molecular weight polymers having low softening points, and the use of high pressure equipment becomes necessary.

The time within which my reaction may be consummated can, of course, be varied within wide limits depending, for example, on the concentration of water-to-monomer ratio, impurities and contaminations of the reaction mass (which should be kept to a minimum), rate of agitation, redox system used, concentration of heavy metal ion or compound, temperature employed, etc. Generally I have found that times of the order of from about 5 to 40 or 50 hours, for example, from 8 to 15 hours, are sufficient within which to complete the reaction.

In order that those skilled in the art may better understand how the present invention may be practiced, the following example is given by way of illustration and not by way of limitation. All parts are by weight. In the example, the reaction was conducted in the substantial absence of oxygen by degassing and using a vacuum system for transfer of the monomeric tetrafluoroethylene.

*Example*

Three tests were conducted in which the following three formulations were employed:

| Component | Sample A | Sample B | Sample C |
|---|---|---|---|
|  | Parts | Parts | Parts |
| Water | 33.0 | 33.0 | 33.0 |
| Soluble Iron Phosphate [1] | 0.002 | 0.002 | 0.002 |
| NaHSO₃ | 0.008 | 0.008 | None |
| HCl | 0.0011 | 0.0011 | 0.0011 |
| Tertiary Butyl Perbenzoate | 0.002 | 0.002 | 0.002 |
| Tetrafluoroethylene | 3.75 | 3.75 | 3.75 |

[1] This comprises iron phosphate containing a small amount of citrate ion to effect solubilization of the iron phosphate in the tetrafluoroethylene.

Each of the above mixtures was charged into a pressure reaction vessel by adding the water and water-soluble components first and degassing the water by freezing it in liquid nitrogen, pumping it and then thawing. The peroxide, that is, the tertiary butyl perbenzoate, was added by first pressurizing the frozen reaction vessel with 99.96% nitrogen and removing the reaction vessel from the vacuum line to add the tertiary butyl perbenzoate contained in an open end capillary tube. This system was again evacuated, and tetrafluoroethylene, which had previously been degassed, was added by vapor phase transfer. The reaction vessel was sealed, and placed in a 0° C. bath and agitated by rotating it end over end. After 15 hours, it was found that sample A contained 3.4 parts polymeric tetrafluoroethylene (90.70% conversion) which was a white, self-adherent powder and which melted under a pressure of 75 p. s. i. at 445° C. Sample B contained 3.6 parts of the polymer after 21 hours at 0° C. representing a conversion of 98%. Sample C, which differed from the other two samples only in the fact that the sodium bisulfite had been omitted, contained no trace of polymer after 60 hours at 0° C. This latter indicates that both components of the redox system are necessary if one is to obtain polymeric tetrafluoroethylene.

The foregoing example illustrates clearly the advantage in employing my newly discovered process for making tetrafluoroethylene. Although the polymerization of tetrafluoroethylene is described in the literature, in general, pressures greater than 1000 p. s. i. and temperatures of the order of 40° C. to 100° C. are stated to be necessary for the reaction. The pressures employed in my invention, especially in the example above, were of the order of about 175 p. s. i.

From the foregoing, it will be apparent that I have discovered a method for making polymeric tetrafluoroethylene easily and rapidly and using relatively low pressures of the order of from about 100 to 300 p. s. i. The conversion to polymer is high, and the product obtained has outstanding properties. The fact that the combination of ingredients and conditions was able to produce the results described could in no way have been predicted since the omission of any of the ingredients or conditions in my system will give poor conversions of the monomer to polymer.

It will, of course, be apparent to those skilled in the art that other conditions of reaction as well as different modifying ingredients other than those used in the foregoing examples, may be employed without departing from the scope of the invention. Many examples of such modifying ingredients as, for example, catalysts, members of the redox system, and monomer-to-water ratios which may be employed, etc., have been given previously. The polymers obtained in accordance with my claimed process are tough and have high softening points. They do not decompose nor evolve gas visibly below 450° C.

The polymers prepared in accordance with my method find a large number of valuable applications. Because of their substantial inertness, they are eminently suitable for applications requiring resistance to various chemical reactants. In addition, because of their heat stability at elevated temperatures, they are advantageously employed as gaskets and valve packings where other materials cannot withstand the corrosive attack or elevated temperatures. Electrical conductors of all sorts such as wires, motor armatures, and cables can be insulated with polymeric tetrafluoroethylene, such insulated conductors being particularly useful because of the inertness of the insulating polymers.

If desired, dispersions of the polymer may be used to coat and impregnate various fillers such as asbestos, glass fibers, aluminum powders, or sheets or hard surfaces of various materials as, for example, metal molds, glass cloth, asbestos cloth, etc. Such treated materials may be molded under heat and pressure to obtain useful objects. In the case of the treated sheets, the latter may be superposed on each other and molded to give laminated panels having outstanding heat resistance and good electrical properties.

What I claim as new and desire to secure by Letters Patent of the United States is:

1. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 1 to 1, (c) an organic peroxide polymerization catalyst for (a), (d) a heavy metal compound whose metal ion is capable of existing in at least two valence states and which compound is soluble in the tetrafluoroethylene, and (e) a water-soluble reducing agent for the heavy metal ion, and (2) effecting reaction under autogenous pressure between the ingredients at a pH of from about 2.3 to 4.0 at a temperature below 35° C. for a time sufficient to effect polymerization of the monomer to polymeric tetrafluoroethylene.

2. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 1 to 1, (c) an organic peroxide polymerization catalyst for (a), (d) a soluble iron phosphate which is soluble in the tetrafluoroethylene, and (e) a water-soluble reducing agent for the iron ion, and (2) effecting reaction under autogenous pressure between the ingredients at a pH of from about 2.3 to 4.0 at a temperature below 35° C. for a time sufficient to effect polymerization of the monomer to polymeric tetrafluoroethylene.

3. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 1 to 1, (c) an organic peroxide polymerization catalyst for (a), (d) an iron benzoate which is soluble in the tetrafluoroethylene, and (e) a water-soluble reducing agent for the iron ion, and (2) effecting reaction under autogenous pressure between the ingredients at a pH of from about 2.3 to 4.0 at a temperature below 35° C. for a time sufficient to effect polymerization of the monomer to polymeric tetrafluoroethylene.

4. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 1 to 1 (c) an organic peroxide polymerization catalyst for (a), (d) a tetrafluoroethylene-soluble mixture of iron sulfate and citric acid, and (e) a water-soluble reducing agent for the iron ion, and (2) effecting reaction under autogenous pressure between the ingredients at a pH of from about 2.3 to 4.0 at a temperature below 35° C. for a time sufficient to effect polymerization of the monomer to polymeric tetrafluoroethylene.

5. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 1 to 1, (c) an organic peroxide polymerization catalyst for (a), (d) a heavy metal compound whose metal ion is capable of existing in at least two valence states and which compound is soluble in the tetrafluoroethylene, and (e) a water-soluble reducing agent for the heavy metal ion comprising sodium bisulfite, and (2) effecting reaction under autogenous pressure between the ingredients at a pH of from about 2.3 to 4.0 at a temperature below 35° C. for a time sufficient to effect polymerization of the monomer to polymeric tetrafluoroethylene.

6. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 1 to 1, (c) an organic peroxide polymerization catalyst for (a), (d) a soluble iron phosphate which is soluble in the tetrafluoroethylene, and (e) a water-soluble reducing agent for (d) comprising sodium bisulfite, and (2) effecting reaction under autogenous pressure between the ingredients at a pH of from about 2.5 to 3.5 at a temperature below 35° C. for a time sufficient to effect polymerization of the monomer to polymeric tetrafluoroethylene.

7. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 1 to 1, (c) an organic peroxide polymerization catalyst for (a), (d) an iron benzoate which is soluble in the tetrafluoroethylene, and (e) a water-soluble reducing agent for (d) comprising sodium bisulfite, and (2) effecting reaction under autogenous pressure between the ingredients at a pH of from about 2.5 to 3.5 at a temperature below 35° C., for a time sufficient to effect polymerization of the monomer to polymeric tetrafluoroethylene.

8. The process for obtaining polymeric tetrafluoroethylene having a solftening point above 350° C., which process comprises (1) forming a suspension of ingredients comprising (a) tetrafluoroethylene as essentially the sole polymerizable ingredient, (b) water, the ratio of water to monomer on a weight basis being above 1 to 1, (c) an organic peroxide polymerization catalyst for (a), (d) a tetrafluoroethylene-soluble mixture of iron sulfate and citric acid, and (e) a water-soluble reducing agent for (d) comprising sodium bisulfite, and (2) effecting reaction under autogenous pressure between the ingredients at a pH of from about 2.5 to 3.5 at a temperature below 35° C. for a time sufficient to effect polymerization of the monomer to polymeric tetrafluoroethylene.

9. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 1 to 1, (c) tertiary butyl perbenzoate, (d) a soluble iron phosphate which is soluble in the tetrafluoroethylene, and (e) a water-soluble reducing agent for (d) comprising sodium bisulfite, and (2) effecting reaction under autogenous pressure between the ingredients at a pH of from about 2.5 to 3.5 at a temperature of from about 0° C. to 30° C., for a time sufficient to effect polymerization of the monomer to polymeric tetrafluoroethylene.

10. The process for obtaining polymeric tetrafluoroethylene having a softening point above 350° C., which process comprises (1) forming a suspension of ingredients comprising (a) tetrafluoroethylene as essentially the sole polymerizable ingredient, (b) water, the ratio of water to monomer on a weight basis being above 2 to 1, (c) from 0.01 to 0.5%, by weight, tertiary butyl perbenzoate, (d) a soluble iron phosphate which is soluble in the tetrafluoroethylene and which is present, by weight, in an amount equal to from 0.01 to 0.5%, the weight of (c) and (d) each being based on the weight of the monomeric tetrafluoroethylene, and (e) sodium bisulfite equal to from 0.01 to 0.5% of the weight of the water, and (2) effecting reaction under autogenous pressure between the ingredients at a pH of about 2.5 to 3.5 at a temperature of from about 0° C. to 30° C., for a time sufficient to effect polymerization of the monomer to the polymeric tetrafluoroethylene.

ROBERT L. MYERS.

REFERENCES CITED

The following references are of record in the file of this patent:

UNITED STATES PATENTS

| Number | Name | Date |
| --- | --- | --- |
| 2,456,255 | Coffman et al. | Dec. 14, 1948 |
| 2,473,549 | Smith | June 21, 1949 |
| 2,569,524 | Hamilton | Oct. 2, 1951 |

FOREIGN PATENTS

| Number | Country | Date |
| --- | --- | --- |
| 796,026 | France | Mar. 27, 1936 |